United States Patent
Ashrafi et al.

(10) Patent No.: US 6,408,687 B1
(45) Date of Patent: *Jun. 25, 2002

(54) MISALIGNMENT DETECTION SYSTEM FOR A STEERING SYSTEM OF AN AUTOMOTIVE VEHICLE

(75) Inventors: Behrouz Ashrafi; Dinu Petre Madau, both of Dearborn, MI (US)

(73) Assignee: Visteon Global Technologies, Inc., Dearborn, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/558,773

(22) Filed: Apr. 26, 2000

(51) Int. Cl.$^7$ ............................................. G01M 19/00
(52) U.S. Cl. ............................................. 73/118.1
(58) Field of Search ............................ 701/1; 73/116, 73/118.1

(56) References Cited

U.S. PATENT DOCUMENTS 6,122,568 A  *  9/2000  Madau et al. ................ 701/1
6,226,587 B1     5/2001  Tachihata et al.

\* cited by examiner

Primary Examiner—Benjamin R. Fuller
Assistant Examiner—Maurice Stevens
(74) Attorney, Agent, or Firm—John Kajander

(57) ABSTRACT

A misalignment detection system (12) for steering system of an automotive vehicle (10) includes a controller (14) coupled to a velocity sensor (18), and a yaw rate sensor (20). The controller is also coupled to a memory (16) that is used to store a steering ratio memory map and a historic steering wheel angle. The controller (14) determines a base steering wheel angle when the vehicle velocity is at a predetermined velocity. The base steering wheel angle is a function of the vehicle velocity, the yaw rate, and the steering ratio. The controller compares the current steering wheel angle with a historic steering wheel angle to determine an error. An indicator (22) may be provided to the vehicle operator to signal the presence of the misalignment of the steering system.

19 Claims, 2 Drawing Sheets

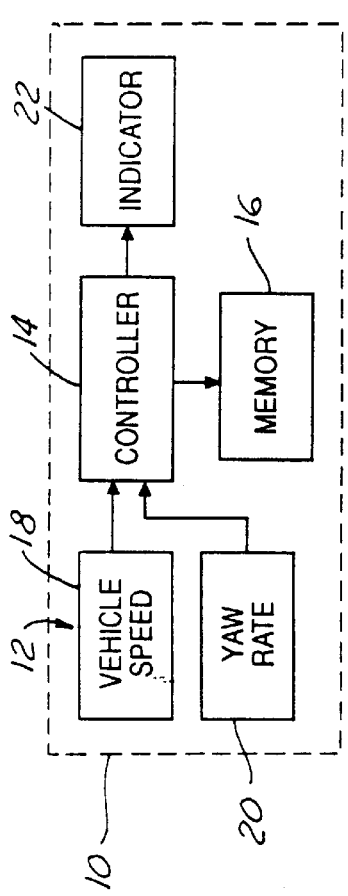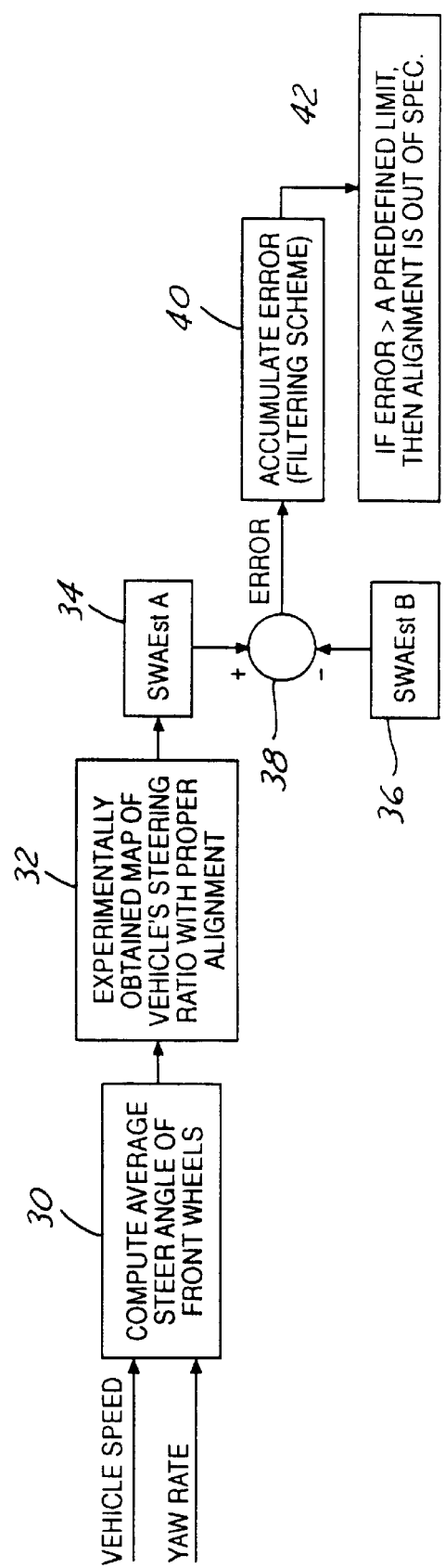

MISALIGNMENT DETECTION SYSTEM FOR A STEERING SYSTEM OF AN AUTOMOTIVE VEHICLE

TECHNICAL FIELD

The present invention relates generally to steering systems for automotive vehicles, and more particularly, to a misalignment detection system for the steering system.

BACKGROUND

During operation of an automotive vehicle, the steering system may become misaligned. Misalignment can occur in an automotive vehicle for various reasons. Particularly in states with harsh winters, potholes and rough roads can cause the steering system to become misaligned.

A misalignment in the present application refers to a misalignment of the steering wheel with the desired direction of travel as set forth by the steering assembly. Misalignment as noticed by the driver occurs when the steering wheel is held in a straight ahead direction and the wheels tend to cause the vehicle to drift away from the directly straight ahead path.

Oftentimes, the misalignment is slight. However, the effects of the misalignment may manifest themselves in the vehicle. For example, a misaligned steering system may cause excessive wear on one portion of the tires. Until such wear is noticed by the vehicle operator, the alignment may go uncorrected. Unfortunately, the excessive wear may require the tires to be prematurely changed due to uneven wear.

It would therefore be desirable to provide a misalignment detection system for an automotive vehicle that signals the driver to the presence of a misalignment so that corrective actions may be taken.

SUMMARY OF THE INVENTION

The present invention provides a misalignment system for a steering system of an automotive vehicle that includes a velocity sensor that generates a vehicle velocity signal indicative of the vehicle velocity. A yaw rate sensor generates a yaw rate signal indicative of the yaw rate of the vehicle. A memory stores a steering ratio memory map and a historic steering wheel angle. A controller is coupled to the velocity sensor, the yaw rate sensor, and the memory. The controller estimates a current steering wheel angle at a predetermined velocity. This estimated steering wheel angle is a function of the vehicle velocity, the yaw rate, and a steering ratio. The controller compares the current steering wheel angle with a historic steering wheel angle to determine an error.

One feature of the invention is that upon a predetermined amount of accumulated error, the vehicle operator may be presented with an indicator to inform him of the misalignment.

In a further aspect of the invention, a method for determining misalignment comprises the steps of:
  detecting a vehicle speed;
  detecting a vehicle yaw rate;
  determining a base steering wheel angle at a predetermined vehicle speed as a function of yaw rate;
  determining an error between the base steering wheel angle and a historic steering wheel angle; and
  indicating an error if the error is above a predetermined level.

One advantage of the invention is that by signaling the vehicle operator of a misalignment, excessive wear to a vehicle'tires or other components may be reduced by corrective action. Another advantage of the invention is that many of the sensors are currently used in other systems of the vehicle. Therefore, implementation of a misalignment detection system according to the present invention may be done in a cost efficient manner.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 1 a block diagrammatic view of a misalignment detection system according to the present invention.

FIG. 2 is a functional flow chart of a misalignment detection system according to the present invention.

DETAILED DESCRIPTION OF THE PREFERRED EMBODIMENT

Figure 3:
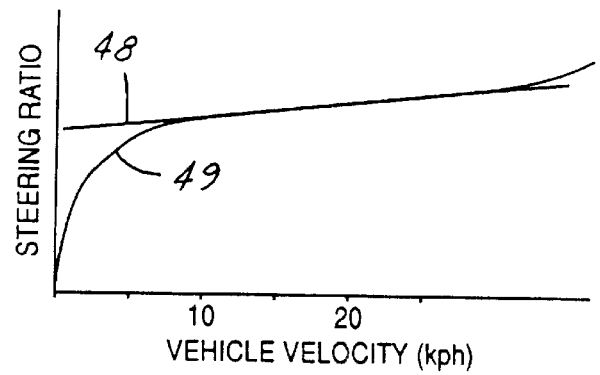
FIG. 3 is a plot of steering ratio as a function of vehicle velocity at a particular steering wheel angle.

In the following figures, the same reference numerals will be used to identify the same components in the various views. The present invention is illustrated with respect to the misalignment system for an automotive vehicle. It should be understood that the present invention may share various sensors and inputs with various other systems of the automotive vehicle.

Referring now to FIG. 1, an automotive vehicle 10 has a misalignment detection system 12 located therein. Misalignment detection system 12 has a controller 14 that is used to receive various information and performs calculations to notify the vehicle operator whether the steering system is misaligned.

Controller 14 is preferably microprocessor-based. Although a dedicated controller 14 may be used in misalignment detection system 12, controller 14 may be part of another system such as the steering control system of the vehicle. Further, controller 14 may also be part of a dynamic control system of vehicle 10.

Controller 14 is coupled to a memory 16. Although shown as a separate component, memory 16 may be incorporated into controller 14. Memory 16 is preferably RAM or ROM. Memory 16 may be a combination of ROM and RAM or other types of memory. Memory 16 is suitable for storing a steering ratio memory map and various other vehicle parameters such as a historic steering wheel angle as will be further described below.

Controller 14 is coupled to a vehicle speed sensor 18. Vehicle speed sensor 18 provides an indication to controller 14 of the vehicle velocity in the longitudinal direction of the vehicle. Speed sensor 18 may comprise any of a variety of devices or systems commonly employed in automotive vehicles. One type of automotive speed sensor 18 suitable for use with a system according to the present invention comprises a speed module for receiving input from multiple speed sensors adapted to indicate the speed of the individual wheels. The speed module derives a longitudinal vehicle speed signal by combining the signals from the speed sensor. The individual wheels speeds are ascertained using pulse generators disposed at each wheel.

A yaw rate sensor 20 is also coupled to controller 14. Yaw rate sensor 20 generates a yaw rate signal indicative of the vehicle yaw rate. Various types of yaw rate sensors may be employed. Suitable yaw rate sensors may include piezoelectric or silicon micro-machined devices.

Controller 14 may be coupled to an indicator 22 to indicate the presence of a misaligned steering system. Indicator 22 may be a malfunction indicator light present on an instrument panel of the vehicle. Indicator 22 may also be an LCD display present within the vehicle. Further, indicator 22 may be a service diagnostic connector so that a service technician with the proper equipment may monitor the information from controller 14.

Memory 16 is suitable for storing a steering ratio memory map and various other vehicle parameters such as a historic steering wheel angle as will be further described below.

Referring now to FIG. 2, a functional block diagram of the misalignment detection system of the present invention is illustrated. In block 30, an average steering angle of the front wheels is determined. As will be further described below, the average steering wheel angle of the front wheels is determined at a predetermined vehicle speed. In block 32, a steering ratio map stored within memory 16 is used to determine base steering wheel angle estimate (SWAEst$_A$) as shown in block 34. The front wheel average steering angle is derived from the vehicle yaw rate and the vehicle speed. Based on the vehicle speed and yaw rate, block 32 obtains the steering wheel angle estimate. The derivation of the steering wheel angle calculation will be further described below.

Block 36 provides a steering wheel angle estimate SWAEst$_B$ that is historical in nature and is derived from a reliable steering wheel estimate source. For example, steering wheel angle estimate may be obtained while the vehicle is proceeding at a high rate of speed (above 45 miles per hour) and the yaw rate is zero. The SWAEst$_B$ will thus provide an accurate true indication as to the straight ahead steering wheel angle estimate.

Signals SWAEst$_A$ and SWAEst$_B$ are combined in summer block 38. The difference in the signals provides an error signal that is accumulated in block 40. The accumulated error 40 may be subject to a numerical filtering scheme as would be evident to those skilled in the art. This filtering scheme may be performed over many ignition cycles to avoid any false detection of misalignment. If the accumulated error is greater than a predefined limit, then the misalignment specification has been exceeded. If this occurs, an indication such as through indicator 22 above may be provided.

Referring now to FIG. 3, the following description is based on the steering wheel angle and the steering ratio. The controller estimates the steering wheel angle of the vehicle at a predetermined threshold while the vehicle is turning (i.e. in parking lot maneuvers).

The function of a center find algorithm is to estimate vehicle's steering wheel angle relative to the angle that will make the vehicle travel along a straight line. This estimation can be obtained from the following relationship:

$$\text{Steering Wheel Angle} = \text{Steering Ratio} * \delta_f * 57.295, \quad (1)$$

where $\delta_f$ is the average of the front tire steer angles.

The Steering Ratio in the above equation represents a map that is developed from experimentally obtained data. Thus the specific data for various vehicles having different steering system may wary. Note that if the Steering Ratio is known or is approximated reasonably well, knowing $\delta_f$ from vehicle's dynamic variables such as yaw rate and vehicle speed, one can get an accurate estimate of vehicle's steering wheel angle that would result in these dynamic variables.

For example, the average of the front tire steer angles, $\delta_f$, can be computed from $$\delta_f = r/u * [L + K_{us}/g * u^2] \quad (2)$$

where r=yaw rate of the vehicle (rad/s),

L=wheel base (m), $K_{us}/g$=understeer coefficient of the vehicle (g=force of gravity), u=longitudinal velocity of the vehicle (m/s), and with a map for the steering ratio (from experimental data), equation (1) can be used to determine an estimate of vehicle's steering wheel angle. Therefore, one can quantify the variations of the steering ratio as a function of vehicle speed and steering wheel angle (or the corresponding average of front tire steer angles).

To quantify these variations, vehicle testing is performed and the yaw rate, vehicle speed, and exact steering wheel angle are measured. Next, the vehicle's yaw rate, speed, and other vehicle parameters are substituted in equation (2) to solve for the average of front tire steer angles, $\delta_f$. Finally, having measured the exact steering wheel angle, equation (1) can be used to solve for the steering ratio, namely, $$\text{Steering Ratio} = \text{Exact Steering Wheel angle}/\delta_f \quad (3)$$

Note that a table can be generated for the Steering Ratio that corresponds to various "Exact Steering Wheel Angle" positions. A typical plot of the steering ratio at one particular steering wheel angle is shown in FIG. 3.

The non-linear relationship between the steering ratio and vehicle velocity can be approximated by a linear equation as shown in FIG. 3. Therefore, the steering ratio can be represented by the following linear equation $$\text{Steering Ratio} = m * \text{vehicle velocity} + b,$$

where m and b are the slope and y-intercept of the linear fit 48 through the Steering Ratio vs. Vehicle Velocity curve 49 of FIG. 3.

Figure 4:
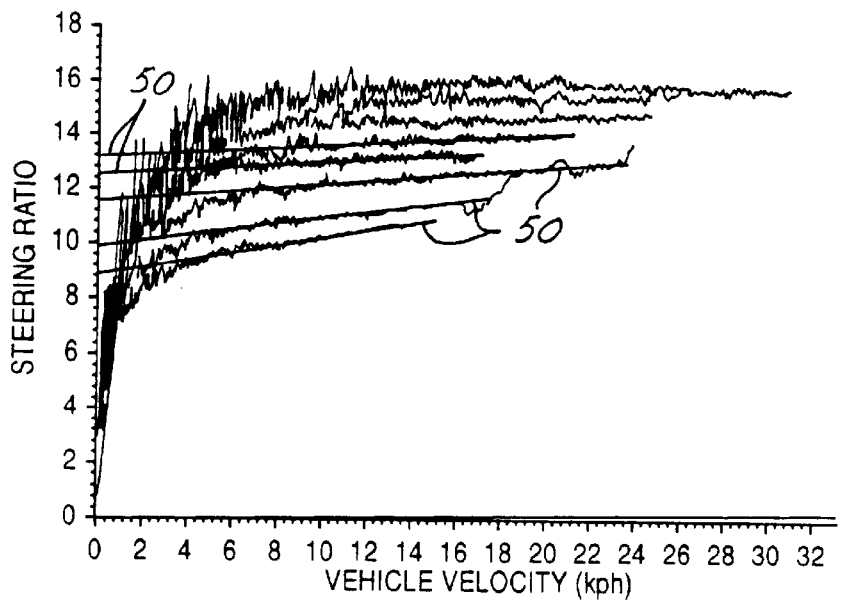
FIG. 4 is a plot of steering wheel ratio as a function of vehicle velocity for several steering wheel angles.
Figure 5:
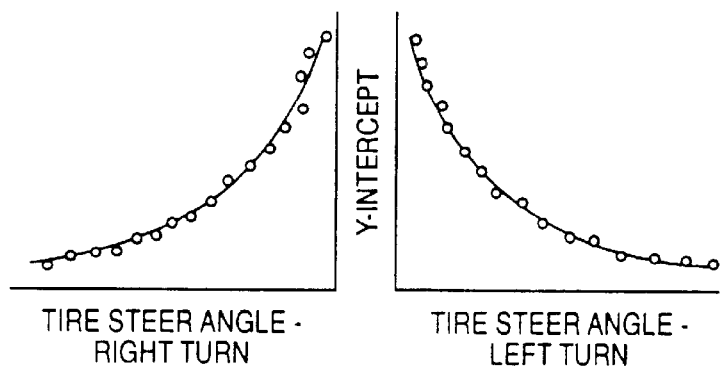
FIG. 5 is a plot of the y-intercept as a function of front tire steer angle for a system according to the present invention.

This relationship is quantified experimentally for all steering wheel angles. By way of example, the vehicle'yaw rate, speed, and exact steering wheel angle are measured at 20 degree increments from left to right lock, resulting in about 50 data runs for angular displacement of about 1000 degrees. Next, for each data run, the average front tire steer angle, $\delta_f$, is computed and substituted in equation (3) to solve for the steering ratio. FIG. 4 represents the steering ratio as a function of vehicle velocity for several steering wheel angles. As seen in FIG. 4, a pattern begins to emerge when going from high to low steering wheel angles. Straight lines 50 through these curves can be fit therein. For each line, as seen in the plot, there exist a unique slope and y-intercept which can be tabulated along with their corresponding front tire steer angles. After tabulating these variables, approximately 50 data points for slope, y-intercept, and their corresponding front tire steer angle may be obtained. The slope and y-intercept data points may then be plotted against their corresponding front tire steer angles. A typical plot of the y-intercept values as a function of front tire steer angle is shown in FIG. 5.

To quantify variations of the y-intercept and slope as a function of tire steer angles, the y-intercept and slope data are fitted with polynomials of second degree. A polynomial fit through the y-intercept vs. tire steer angle is shown in FIG. 4. The curve fits for the y-intercept and slope can be represented by the following polynomials;

$$b = a_1\delta_f^2 + a_2\delta_f + a_3, \quad (4)$$

$$m = c_1\delta_f^2 + c_2\delta_f + c_3 \quad (5)$$

where b and m are the y-intercept and slope of the lines that are fitted through the steering ratio curves of FIG. 4. The coefficients $a_i$ and $c_i$ can be realized using any curve fitting algorithm. Now, the steering ratio can be expressed in terms of a linear function of speed with slope of m and y-intercept of b which themselves are quadratic functions of the steering ratio, $\delta_f$. Recall that knowing the vehicle's yaw rate and speed, the steering ratio, $\delta_f$, can be calculated from equation (2).

To summarize, given the vehicle's yaw rate and speed, $\delta_f$ can be calculated from equation (2). Once $\delta_f$ is known, b and m can be calculated from equations (4) and (5) with coefficients $a_i$ and $c_i$ having been realized from experimental data. Then, the steering ratio can be calculated from the following equation $$\text{Steering Ratio} = m^* \text{vehicle speed} + b. \quad (6)$$

Note that the above equation represents the family of straight line fits seen in FIG. 4. Now that the steering ratio has been computed, one can estimate vehicle's steering wheel angle using equation (1). That is, $$\text{Steering Wheel Angle Estimate} = \text{Steering Ratio}^*\delta_f^*57.295.$$

The above theoretical description can be used to realize the polynomial coefficients of equations (4) and (5). Once these coefficients have been identified for a particular vehicle configuration, the vehicle's steering wheel angle can be very accurately estimated from its speed and yaw rate.

In operation, a historical steering wheel angle estimate may be maintained during the operation of the vehicle. The low speed steering wheel angle estimate is then compared with the historical steering wheel angle estimate to determine an error. The error corresponds to the amount of misalignment of the wheels of the vehicle from a true straight position. The misalignment may then be communicated to the vehicle operator through the indicator 22. Thus, in response to the indicator the vehicle operator may then have the vehicle serviced to place the vehicle into alignment. This operation if performed on a timely basis will reduce the amount of tire wear and other effects on the vehicle.

While particular embodiments of the invention have been shown and described, numerous variations alternate embodiments will occur to those skilled in the art. Accordingly, it is intended that the invention be limited only in terms of the appended claims.

What is claimed is:

1. A misalignment detection system for a steering system comprising:
   a velocity sensor generating a vehicle velocity signal indicative of a vehicle velocity;
   a yaw rate sensor generating a yaw rate signal indicative of a vehicle yaw rate;
   a memory of storing a steering ratio memory map and a historic steering wheel angle; and
   a controller coupled to the velocity sensor, the yaw rate sensor and the memory, the controller determining a base steering wheel angle when vehicle velocity is at a predetermined velocity, said base steering wheel angle being a function of vehicle velocity, yaw rate and a steering ratio, said controller comparing said base steering wheel angle with a historic steering wheel angle to determine an error.

2. A misalignment detection system as recited in claim 1 further comprising an indicator coupled to said controller.

3. A misalignment detection system as recited in claim 2 wherein said indicator is selected from the group of a warning light, an audible and a connector.

4. A misalignment detection system as recited in claim 2 wherein said controller accumulates an accumulated error over time and controls said indicator in response to said accumulated error.

5. A misalignment detection system as recited in claim 1 wherein said controller determines an average steer angle of front wheels in response to said vehicle speed and yaw rate.

6. A misalignment detection system as recited in claim 5 wherein said controller determines the base steering wheel angle as a function of a steering ratio map and the average steer angle of front wheels.

7. A method of detecting misalignment of the steering system of an automotive vehicle comprising the steps of:
   determining a base steering wheel angle at a predetermined vehicle speed;
   determining an error between the base steering wheel angle and a historic steering wheel angle; and
   indicating a misalignment when said error is greater than a predetermined error.

8. A method as recited in claim 7 further comprising the steps of detecting a vehicle speed and a yaw rate.

9. A method as recited in claim 8 wherein said step of determining an average steer angle of front wheels comprises determining an average steer of front wheels as a function of vehicle speed and yaw rate.

10. A method as recited in claim 7 wherein said step of determining base steering wheel angle comprises the step of determining a base steering wheel angle as a function of a steering ratio and the average steer angle of front wheels.

11. A method as recited in claim 10 further comprising the step of obtaining the steering ratio from a map.

12. A method as recited in claim 7 further comprising the steps of accumulating said error over time to obtain an accumulated error and controlling said indicator in response to said accumulated error.

13. A method as recited in claim 12 wherein the step of controlling the indicator in response to said accumulated error comprises the step of controlling the indicator when the accumulated error exceeds an error threshold.

14. A method of detecting misalignment of the steering system of an automotive vehicle comprising the steps of:
   detecting a vehicle speed;
   detecting a vehicle yaw rate;
   determining a base steering wheel angle at a predetermined vehicle speed as a function of yaw rate;
   determining an error between the base steering wheel angle and a historic steering wheel angle; and
   indicating an error if the error is above a predetermined level.

15. A method as recited in claim 14 wherein in said step of determining an estimated steering angle comprises the step of determining an average steer angle of front wheels as a function of vehicle speed and yaw rate.

16. A method as recited in claim 15 wherein said step of computing a base steering wheel angle comprises the step of determining a base steering wheel angle as a function of a steering ratio and the average steer angle of front wheels.

17. A method as recited in claim 14 further comprising the step of obtaining the steering ratio from a map.

18. A method as recited in claim 14 further comprising the steps of accumulating said error over time to obtain an accumulated error and controlling the indicator in response to said accumulated error.

19. A method as recited in claim 18 wherein the step of controlling the indicator in response to said accumulated error comprises the step of controlling the indicator when the accumulated error exceeds an error threshold.

\* \* \* \* \*